US012802502B2

(12) United States Patent
Xie

(10) Patent No.: US 12,802,502 B2
(45) Date of Patent: Nov. 17, 2026

(54) HEALTH DIAGNOSIS METHOD AND SYSTEM FOR MOTOR BEARINGS OF ELECTRIC VEHICLE

(71) Applicant: Aktiebolaget SKF, Gothenburg (SE)

(72) Inventor: Caifu Xie, Chongqing (CN)

(73) Assignee: Aktiebolaget SKF, Gothenburg (SE)

( * ) Notice: Subject to any disclaimer, the term of this patent is extended or adjusted under 35 U.S.C. 154(b) by 191 days.

(21) Appl. No.: 18/633,603

(22) Filed: Apr. 12, 2024

(65) Prior Publication Data

US 2024/0355154 A1 Oct. 24, 2024

(30) Foreign Application Priority Data

Apr. 21, 2023 (CN) ........................ 202310436900.X

(51) Int. Cl.
*G07C 5/08* (2006.01)

(52) U.S. Cl.
CPC .................................. *G07C 5/0808* (2013.01)

(58) Field of Classification Search
CPC .. G07C 5/0808; B60L 3/0061; G01M 13/045; G01M 13/04; G01M 15/00; G01M 15/02; G01M 17/007
See application file for complete search history.

(56) References Cited

U.S. PATENT DOCUMENTS

| | | | | |
|---|---|---|---|---|
| 2020/0169198 A1* | 5/2020 | Cha | ................... | H02M 7/53871 |
| 2020/0348207 A1* | 11/2020 | Wang | ........................ | H02H 3/50 |
| 2021/0286995 A1* | 9/2021 | Zhu | ........................ | G01M 13/04 |
| 2025/0258061 A1* | 8/2025 | Lebacher | ............ | G01M 13/045 |

* cited by examiner

*Primary Examiner* — Michael V Kerrigan
(74) *Attorney, Agent, or Firm* — Stinson LLP

(57) ABSTRACT

A health diagnosis method and system for motor bearings of electric vehicles. The method includes collecting parameter data related to the motor bearings; preprocessing the parameter data to generate preprocessed parameter data; performing a feature extraction processing on the preprocessed parameter data to obtain one or more features; and inputting the one or more obtained features into an abnormality detection model, and diagnosing health condition of the motor bearings based on an output of the abnormality detection model. The parameter data includes current data associated with a motor of the electric vehicle and/or rotor rotation data associated with a rotor of the motor. Using the health diagnosis method and system for the motor bearings, the health condition of the motor bearings can be monitored without additionally arranging a particular acceleration sensor in the electric drive system, thus avoiding the increase of the cost.

20 Claims, 3 Drawing Sheets

HEALTH DIAGNOSIS METHOD AND SYSTEM FOR MOTOR BEARINGS OF ELECTRIC VEHICLE

CROSS-REFERENCE TO RELATED APPLICATION

This application claims priority to Chinese Application No. 202310436900.X, filed Apr. 21, 2023, the entirety of which is hereby incorporated by reference.

FIELD

The disclosure relates to the field of electric vehicles, in particular to a health diagnosis method and system for motor bearings of electric vehicles based on artificial intelligence.

BACKGROUND

In electric vehicles, an electric drive system used to ensure the driving ability is an important part of electric vehicles. The reliability of electric drive system is limited by its mechanical components, especially by various rotating mechanical components including bearings. For example, when various bearings (such as motor bearings) in the electric drive system are in an unhealthy state (such as peeling, etc.), their vibration characteristics will become abnormal, which will affect the reliability of the electric drive system, and then affect the driving ability and safety of the electric vehicle. Therefore, it is necessary to monitor the health condition of bearings in the electric drive system of electric vehicles, especially motor bearings.

In general industrial fields, vibration sensors (for example, acceleration sensors) are usually used to perform condition monitoring for bearings or other rotating mechanical components. Academia and industry have conducted extensive and in-depth research on this approach. However, when this general approach is implemented in electric vehicles, the following problems are encountered. First of all, acceleration sensors are relatively expensive, which is not suitable for the automobile industry that is very sensitive to cost. Secondly, the acceleration sensor is a relatively fragile and easily damaged electronic component, and its reliability is sometimes lower than that of the monitored target component. Therefore, the commonly used bearing abnormality monitoring methods based on acceleration sensor signals will become unreliable when applied to electric vehicles, so that the reliability of electric drive system can not be effectively monitored, and then the running performance of electric vehicles will be affected.

Therefore, it is necessary to develop a health diagnosis method and system for motor bearings of electric vehicles to solve the above problems.

SUMMARY

One aspect of the present disclosure provides a health diagnosis method for motor bearings of an electric vehicle. The method comprises: collecting parameter data related to the motor bearings; preprocessing the parameter data to generate the preprocessed parameter data; performing a feature extraction processing on the preprocessed parameter data to obtain one or more features; and inputting the one or more obtained features into an abnormality detection model, and diagnosing health condition of the motor bearings based on an output of the abnormality detection model; wherein the parameter data includes at least one of current data associated with a motor of the electric vehicle and rotor rotation data associated with a rotor of the motor.

According to one or more embodiments, the method may further comprise training the abnormality detection model. The training may comprise: obtaining parameter data related to the motor bearings from a training data set; preprocessing the parameter data to generate the preprocessed parameter data; performing feature extraction processing on the preprocessed parameter data to obtain one or more features; and training the abnormality detection model by taking at least one of the one or more features as an input to the abnormality detection model and taking data corresponding to the health condition of the motor bearings as an output of the abnormality detection model.

According to one or more embodiments, the rotor rotation data includes rotation speed information and angular position information of rotation of the rotor.

According to one or more embodiments, the current data is obtained by a current sensor, and the rotor rotation data is obtained by a resolver.

According to one or more embodiments, the current sensor is arranged to be electrically coupled to a stator in the motor, and the resolver is installed on a motor shaft of the motor.

According to one or more embodiments, the preprocessing the parameter data comprises performing a band-pass filtering processing on the parameter data.

According to one or more embodiments, the feature extraction processing comprises extracting at least one of the following features based on the preprocessed parameter data: kurtosis, skewness, root mean square, peak-to-peak value, variance, impulse factor and power spectral density.

According to one or more embodiments, the diagnosing the health condition of the motor bearings based on the output of the abnormality detection model comprises: comparing an output value of the abnormality detection model with a threshold; diagnosing the health condition of the motor bearings as healthy if the output value is less than or equal to the threshold; or diagnosing the health condition of the motor bearings as unhealthy if the output value is greater than the threshold; wherein the output value of the abnormality detection model is indicative of an abnormality probability value of the motor bearings.

Another aspect of the disclosure also provides a health diagnosis system for motor bearings of the electric vehicle. The system may include a memory and a processor coupled to the memory. The processor in the disclosure as a whole can be a microprocessor, an application specific integrated circuit (ASIC), a system on a chip (SoC), a computing device, a portable mobile computing device, and the like. The processor may be configured to perform the following: receiving parameter data related to the motor bearings which are collected by sensors; preprocessing the parameter data to generate preprocessed parameter data; performing a feature extraction processing on the preprocessed parameter data to obtain one or more features; and inputting the one or more obtained features into an abnormality detection model, and diagnosing health condition of the motor bearings based on an output of the abnormality detection model, wherein the parameter data includes at least one of current data associated with a motor of the electric vehicle and rotor rotation data associated with a rotor of the motor.

Another aspect of the present disclosure also provides a computer-readable storage medium comprising instructions, which are executed by a computer to realize the above health diagnosis method.

Therefore, the method and the system for diagnosing the health condition of the motor bearings of the electric vehicle provided by this disclosure can establish/train and use the abnormality detection model only based on the monitoring data of the commonly used sensors already installed in the electric vehicle, so as to realize the real-time monitoring of the health condition of the motor bearings without additionally installing a specific acceleration sensor in the electric drive system, thereby avoiding the increase of the cost. In addition, in the method and system provided by this disclosure, the artificial intelligence model is established and trained by combining a plurality of features, so that the robustness of the output result of the model can be improved, and the accuracy of detection by using the method and system of the disclosure is improved. Therefore, it can provide timely, accurate and perfect early warning for the abnormality of the motor bearings of the electric drive system. By giving early warning to drivers or maintenance personnel, the occurrence of faults of motor bearings can be avoided as much as possible, thus prolonging the service life of motor bearings, thereby reducing the maintenance cost of the system, and further ensuring the driving performance and safety reliability of electric vehicles.

BRIEF DESCRIPTION OF THE DRAWINGS

The system can be better understood with reference to the following description taken in conjunction with the accompanying drawings. The components in the drawings are not to scale, emphasis instead being placed upon illustrating the principles of the present disclosure. Furthermore, in the drawings, similar or identical reference numerals represent similar or identical elements.

DESCRIPTION OF THE EMBODIMENTS

Figure 1:
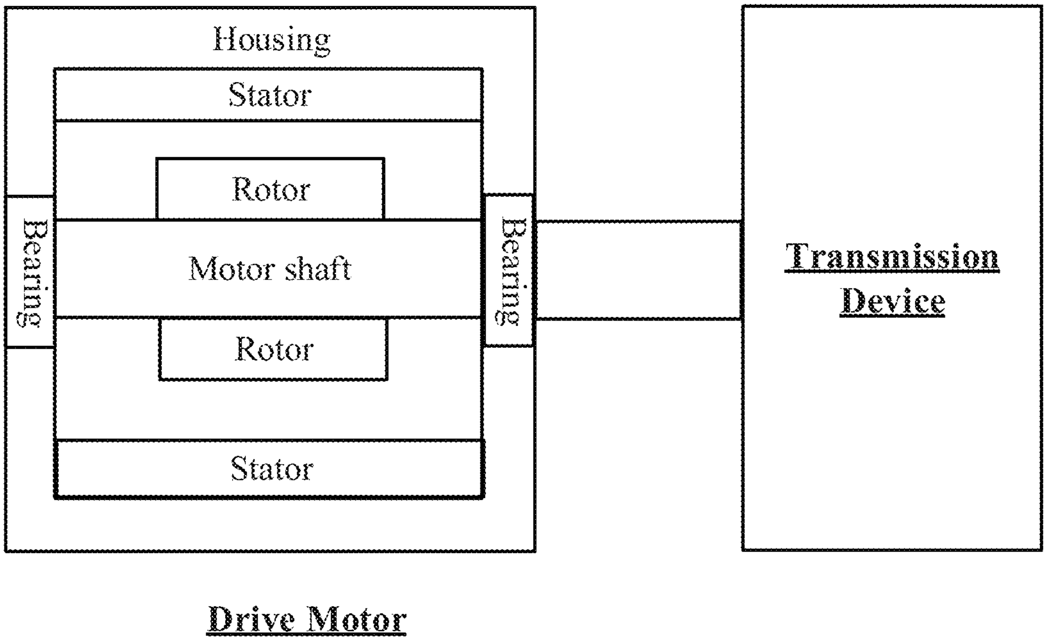
FIG. 1 schematically shows a sectional view of a part of structure of an electric drive system of an electric vehicle.

It should be understood that the following description of the embodiments is given for illustrative purposes only, and is not restrictive. The division of examples among functional blocks, modules or units shown in the drawings should not be interpreted to mean that these functional blocks, modules or units must be implemented as physically separate units. The functional blocks, modules or units shown or described may be implemented as individual units, circuits, chips, functions, modules or circuit elements. One or more functional blocks or units may also be implemented in a common circuit, chip, circuit element or unit.

Usually, the electric drive system of an electric vehicle consists of a drive motor (or motor for short), a motor controller and a transmission device. The main function of the driving motor is to provide power for the electric vehicle, and to convert electric energy into rotating mechanical energy, which mainly includes a stator, a rotor, structural components and a housing. The function of the motor controller (such as ECU) is to control the operation state of motor in real time based on hardware and software design, so that it can operate according to the required direction, speed, torque and response time. It is mainly composed of control logic devices, power components, control software and sensors. The function of the transmission device is to reduce the rotational speed of the driving motor and increase the torque of the driving motor, so as to ensure that the torque and rotational speed of the driving motor meet the needs of the vehicle. It is mainly composed of a reducer, a gear set, a clutch and a half shaft.

In order to facilitate intuitive understanding, FIG. 1 illustratively shows a schematic cross-sectional diagram of part of the structure of the electric drive system of an electric vehicle. In the schematic diagram of the electric drive system shown in FIG. 1, only the drive motor and transmission device are shown. Among them, the driving motor includes a stator, a rotor, a motor shaft, motor bearings (or simply bearings) sleeved on the motor shaft, and a housing containing these components. In addition, although not shown in FIG. 1, it can be understood that the electric drive system may further include a plurality of sensors, such as a position/speed sensor, a current sensor, a voltage sensor, a temperature sensor, a resolver and the like. Based on the monitoring data of some components in the electric drive system obtained by these sensors, the controller can realize the motor control function and protect the electric drive system from abnormal operating conditions. Although these sensors can't directly monitor the condition of motor bearings through vibration measurements, the inventor of this disclosure realized that there is a certain correlation between the vibration of rotating mechanical components including motor bearings and the monitoring data of some sensors.

Based on the above, the disclosure proposes an artificial intelligence method for diagnosing the health condition of motor bearings of electric vehicles. This method can only monitor the condition of motor bearings based on common sensors (for example, the current sensors and the resolver) already installed in electric vehicles, without additional special acceleration sensors, thus avoiding the increase of the cost.

Usually, in an electric drive system, at least two current sensors (such as phase current sensors) are used to capture the real current information of the motor, so that the control system of the motor can realize a closed-loop control of the current. When the motor bearings sleeved on the motor shaft become unhealthy, an abnormally high periodic impulse will appear in the current signal captured by the current sensor. This is because the vibration of the bearings will shake the motor shaft, resulting in weak vibration of the motor shaft. Via the rotor, the vibration of the motor shaft will lead to the incompleteness of rotation, thus resulting in additional harmonic components in the back electromotive force (electromagnetic force). The back electromotive force can be reflected as an important element in the current, which provides the possibility of using current sensors to capture the vibration of bearings. In other words, the current signal captured by the current sensor can be correlated with the health of the bearing.

The resolver is usually used in the permanent magnet motor in the electric drive system. The resolver is a sensor used to monitor the rotation of the rotor, which can capture the angular position and angular speed of the rotor. The angular position information and angular speed information of the rotor obtained by the resolver are necessary information to realize vector control (for example, coordinate transformation) in the motor. A resolver usually consists of two parts: a rotating part and a stationary part. The rotating part is installed on the motor shaft and rotates synchronously with the motor shaft. Then, the reluctance formed by the design of the rotating part will change as it rotates. With the vibration of the motor shaft, the rotating part of the resolver will also shake. As mentioned above, if the bearing is in an unhealthy state, the bearing's vibration will shake the motor shaft, resulting in weak vibration of the motor shaft. Therefore, additional harmonics containing bearing vibration information will eventually appear in the angular position and angular speed information captured by the resolver. That is, the angular position and angular speed signals captured by the resolver can be correlated with the health of the bearing.

Figure 2:
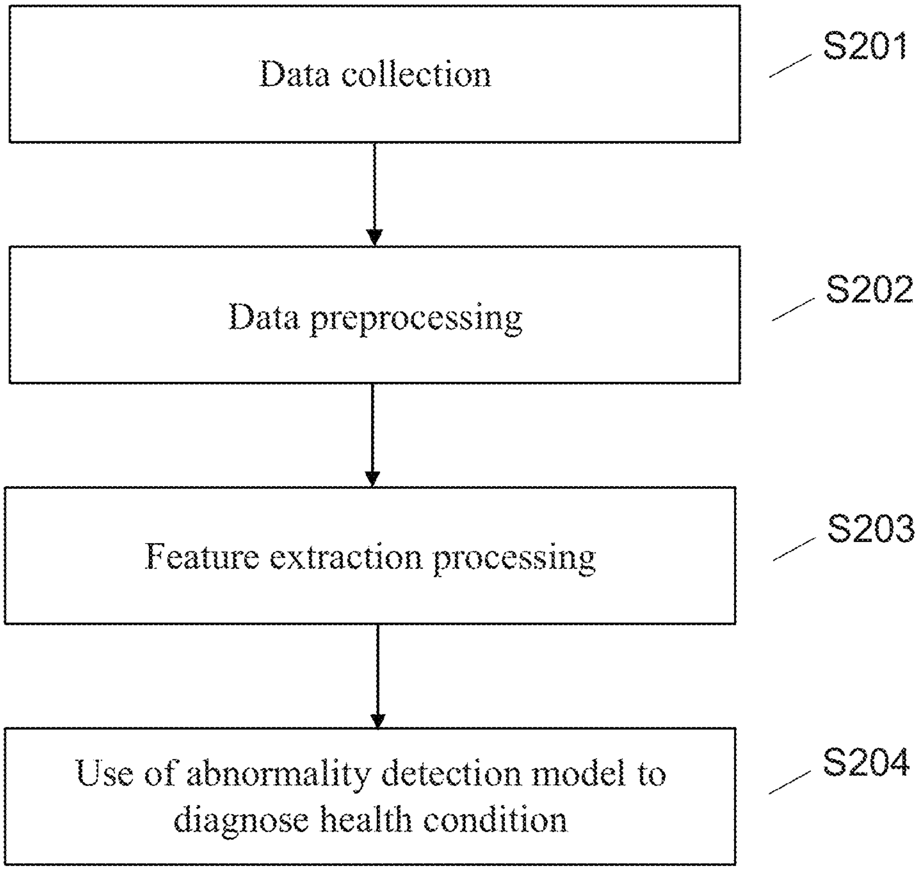
FIG. 2 schematically shows a flowchart of a health diagnosis method for motor bearings according to one or more embodiments of the present disclosure.

FIG. 2 schematically shows a flowchart of a method for diagnosing the health condition of motor bearings according to one or more embodiments of the disclosure.

Referring to FIG. 2, at S201, parameter data related to motor bearings may be collected. When the electric vehicle runs under predefined operating conditions (such as speed and torque configuration) and the electric drive system reaches a steady state (such as energy and heat balance, no speed oscillation), the control system in the electric vehicle, such as vehicle controller (VCU) or motor controller (motor ECU), will record various information data for a certain period of time, for example, parameter data such as current, angle and temperature. These information data can be obtained through various sensors. In some embodiments, the parameter data may include at least one of current data associated with the motor of the electric vehicle and rotor rotation data associated with the rotor of the motor. The current data can be obtained by the current signal collected by the current sensor, which can be electrically coupled to the stator in the motor. The current sensor is, for example, a three-phase current sensor of a motor. The rotor rotation data associated with the motor may include the speed information of rotation and the angular position information of rotation of the rotor. The rotating speed information and the rotating angle position information of the rotor can be obtained by the resolver. The resolver can be installed on the motor shaft of the motor.

At S202, the preprocessing for parameter data collected by the current sensor and resolver can be performed. In some embodiments, the preprocessing may comprise performing the band-pass filtering processing on the collected parameter data. In some examples, the current signal collected by the current sensor is passed through a band-pass filter to remove irrelevant low-frequency signals, fundamental frequency signals and high-frequency noise, thus obtaining the preprocessed current data. In other examples, the output signal of the resolver is decoded to obtain a rotor rotation signal associated with the motor, and the obtained signal is passed through a low-pass filter to remove high-frequency noise in the signal, thereby obtaining the processed rotor rotation data. For example, the rotor rotation data may include speed information of rotation and angular position information of rotation. In some embodiments, the preprocessing may further comprise normalizing the filtered signal. In some embodiments, the preprocessing may further comprise screening the collected parameter data through preset conditions to remove parameter data that do not meet the preset conditions. The preset conditions may be set by the engineer according to experience, such as null values, constant values or data outside the effective numerical range of the above parameters. That is to say, if data of null values, constant values or data outside the effective numerical range of the above parameters are detected, such data will be eliminated. After the preprocessing of parameter data, the amount of data to be processed later can be reduced and the proportion of useful data can be increased, so that the speed of subsequent calculation and processing can be improved, the data processing time can be reduced and the data processing efficiency can be improved.

At S203, the feature extraction processing is performed on the parameter data obtained after the above preprocessing. In some embodiments, based on the preprocessed parameter data, at least one of the following features is extracted: kurtosis, skewness, root mean square (RMS), peak-to-peak value, variance, impulse factor and power spectral density (PSD). Among them, the kurtosis, skewness, RMS, peak-to-peak value, variance and impulse factor are time-domain characteristics; the PSD is a frequency-domain feature. The formulas for calculating the values of the above features are well known to those skilled in the art and will not be described here. The calculated eigenvalues of each feature can be stored in a memory or provided as input to the abnormality detection model or algorithm.

At S204, the extracted features are input into the abnormality detection model or algorithm, and the health condition of the motor bearings is diagnosed based on the output of the abnormality detection model or algorithm.

In some embodiments, the abnormality detection model or algorithm is realized by an artificial intelligence algorithm, and it is necessary to train the abnormality detection model (the training process will be described below with reference to FIG. 3).

In some examples, artificial intelligence algorithms that can be used include but are not limited to Support Vector Machine (SVM) algorithms. The core purpose of SVM algorithm is to find a hyperplane that can be used as a classifier to separate two kinds of data sets. The basic principles of SVM include: in order to find the two support vectors with the largest interval, Lagrange function can be created to obtain hyperplane; finally, the decision function can be made to get the classifier.

In other examples, SVM algorithm can also be combined with artificial intelligence algorithm called Principal Component Analysis (PCA) to obtain the SVM-based PCA classifier. PCA is a dimensionality reduction technique, which aims to simplify the problem by reducing the dimension of feature vectors by using the idea of dimensionality reduction. In statistics, PCA is a technique to simplify data sets. It is a linear transformation. This transformation transforms the data into a new coordinate system, so that the first largest variance of any data projection is in the first coordinate (called first principal component), the second largest variance is in the second coordinate (second principal component), and so on. PCA technology is often used to reduce the dimension of data sets, while maintaining the features of data sets that contribute to the variance the most. In other words, the goal of PCA is to find new variables, make them reflect the main features of things, reduce the size of the original data matrix, reduce the dimension of feature vectors, and select the least dimension to summarize the most important features. The new variables are called "principal components", which can reflect the influence of the original variables to a great extent. Through principal component analysis, the data space can be compressed, so that the features of multivariate data can be expressed intuitively in the low-dimensional space.

In some embodiments, the abnormality detection model or algorithm outputs data corresponding to the health condition of motor bearings. Based on the data of the health condition, the health condition of the motor bearings can be diagnosed.

In some examples, the health data output by the abnormality detection model or algorithm may be numerical values representing classification. For example, a value of −1 represents an unhealthy classification, and a value of 1 represents a healthy classification. Therefore, whether the motor bearings are in a healthy state or an unhealthy state can be diagnosed based on the output of the abnormality detection model or algorithm.

In other examples, the health data output by the abnormality detection model or algorithm may be an abnormality probability value representing the probability of motor bearings abnormality. For example, the abnormality probability value is a percentage value that is equal to or greater than 0% and equal to or less than 100%. Then, diagnosing the health condition of the motor bearings based on the output of the abnormality detection model can include: comparing an output value of the abnormality detection model with a threshold; diagnosing the health condition of the motor bearings as healthy if the output value is less than or equal to the threshold; or diagnosing the health condition of the motor bearings as unhealthy if the output value is greater than the threshold. Among them, the threshold is a value greater than 0% and less than 100% that can be preset by engineers according to the actual situation. For example, the threshold can be set to 50%. It can be understood that the above numerical ranges of the abnormality probability value and the threshold are for illustration, not for exclusive limitation.

In some alternative embodiments, the health diagnosis results may be stored in the memory and/or outputted. For example, the outputted health diagnosis results can be displayed to the driver through a display screen (for example, an automobile dashboard) or an alarm sound/voice can be issued through an alarm device/voice device to remind the driver that the motor bearings are abnormal. Alternatively, the health diagnosis results can be stored to be displayed to the driver or maintenance personnel when they call the results.

The above method of the disclosure can provide timely, accurate and perfect early-warning for the abnormality of the motor bearings of the electric drive system. By giving early-warning to drivers or maintenance personnel, the occurrence of motor bearings faults can be avoided as much as possible, thus prolonging the service life of motor bearings, further reducing the maintenance cost of the system, and further ensuring the driving performance and reliability of safety of electric vehicles.

Figure 3:
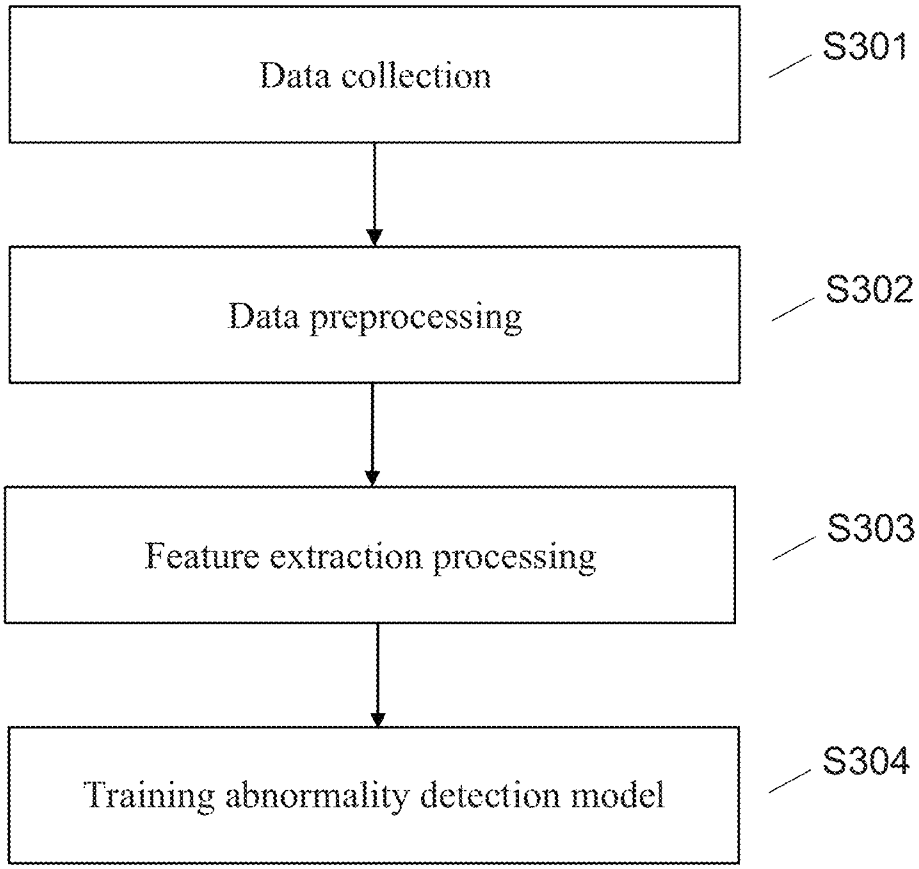
FIG. 3 schematically shows a flowchart of a method for training an abnormality detection model according to one or more embodiments of the present disclosure.

FIG. 3 schematically shows a flowchart of a method for training an abnormality detection model or algorithm according to one or more embodiments of the present disclosure.

As shown in FIG. 3, the process of training the model may comprise data collection at S301 to obtain parameter data related to the motor bearings. Unlike the data collection step S201 shown in FIG. 2, the collected data in FIG. 3 comes from a training data set. The training data set is a data set including a large number of samples associated with healthy and unhealthy motor bearings. For example, the training data set may be a data set from a large number of historical abnormality inspection reports.

Next, the collected parameter data is preprocessed at S302. This preprocessing may include the preprocessing described above with reference to S202 in FIG. 2. In addition, in some embodiments, the preprocessing may also include setting a plurality of labels for the parameter data.

In some examples, the process of setting the plurality of labels for the parameter data may comprises dividing data samples used for training, such as data samples related to motor bearings, into a plurality of health grades, and setting corresponding labels for data related to the motor bearings according to the health grade of the motor bearings. For example, health grades 1-10 can be classified. Health grades 1-10 may correspond to the same or different labels, respectively. For example, grades 1-3 correspond to label 0, grades 4-7 correspond to label 1, and grades 8-10 correspond to label 2. The health grade represented by grades 1 to 10 decreases in turn. Thus, the label represents the health condition grade of the motor bearings. It can be understood by those skilled in the art that the number of labels, the number of grades and/or the order of labels/grades are set here for illustrative purposes, but not for limitation. Because different labels are set for parameter data, features with different labels will be generated in the subsequent feature extraction processing part. By using features with different labels as the input to the model, the model can be further trained in detail, so that the health grade of motor bearings can be further obtained through the output from the model.

It should be noted that data preprocessing can further comprise labeling data only when it is used to train the model. In the process of diagnosing the condition of the motor bearings through the trained abnormal model of the disclosure there is no need to set labels for the data.

At S303, the feature extraction is performed based on the preprocessed parameter data to obtain one or more features with labels. Next, at S304, the abnormality detection model is trained by using at least one of one or more features with labels as input and data corresponding to the health condition of motor bearings as output of the abnormality detection model. Among them, the abnormality detection model can be realized by algorithms including but not limited to SVM and PCA based on SVM algorithms. Establishing and training the artificial intelligence model through the combination of multiple features can improve the robustness of output results of the model, thus improving the accuracy of detection.

One or more embodiments of the present disclosure also provide a health diagnosis system for motor bearings of electric vehicles. The system may include a memory and a processor coupled to the memory. The processor of the present disclosure as a whole can be a microprocessor, an application specific integrated circuit (ASIC), a system-on-chip (SoC), a vehicle-mounted computing device, and the like. The processor may be configured to receive parameter data related to the motor bearings collected by sensors; preprocessing the parameter data to generate preprocessed parameter data; perform a feature extraction on the preprocessed parameter data; input the extracted features into an abnormality detection model, and diagnosing the health condition of the motor bearings based on the output of the abnormality detection model; wherein the parameter data includes at least one of current data associated with a motor of the electric vehicle and rotor rotation data associated with a rotor of the motor.

It can be understood that the above-mentioned health diagnosis method and system for motor bearings of electric vehicles can also be applied to health diagnosis of other rotating parts, such as motor shafts and gears.

Any one or more of the processors, memories or systems described herein include computer-executable instructions that can be compiled or interpreted from computer programs created using various programming languages and/or technologies. In general, a processor, such as a microprocessor, receives and executes instructions, for example, from a memory, a computer-readable medium, and the like. A processor includes a non-transitory computer-readable storage medium capable of executing instructions of a software program. The computer-readable medium may be, but is not limited to, an electronic storage device, a magnetic storage device, an optical storage device, an electromagnetic storage device, a semiconductor storage device or any suitable combination thereof.

The description of the embodiments has been presented for purposes of illustration and description. Suitable modifications and variations of the embodiments can be carried out in view of the above description or can be obtained by practical approaches. For example, unless otherwise indicated, one or more of the described methods may be performed by a combination of suitable devices and/or systems. The method may be performed by executing stored instructions with one or more logic devices (e.g., processors) in combination with one or more additional hardware elements (such as storage devices, memories, circuits, hardware network interfaces, etc.). The method and associated actions may also be performed in parallel and/or simultaneously in various orders other than those described in this application. The system is exemplary in nature and may include additional elements and/or omit elements. The subject matter of the present disclosure includes all novel and non-obvious combinations of various disclosed methods and system configurations and other features, functions and/or properties.

As used in this application, an element or step recited in the singular and preceded by the word "a/an" should be understood as not excluding a plurality of said elements or steps unless such exclusion is indicated. Furthermore, references to "one embodiment" or "one example" of the present disclosure are not intended to be interpreted as excluding the existence of other embodiments that also incorporate the enumerated features. The disclosure has been described above with reference to specific embodiments. However, those skilled in the art will understand that various modifications and changes can be made thereto without departing from the broader spirit and scope of the disclosure as set forth in the appended claims.

What is claimed is:

1. A health diagnosis method for motor bearings of an electric vehicle, the health diagnosis method comprising:
- collecting parameter data related to the motor bearings;
- preprocessing the parameter data to generate preprocessed parameter data;
- performing a feature extraction processing on the preprocessed parameter data to obtain one or more features; and
- inputting the one or more obtained features into an abnormality detection model, and diagnosing a health condition of the motor bearings based on an output of the abnormality detection model;
- wherein the parameter data includes rotor rotation data associated with a rotor of a motor of the electric vehicle.

2. The health diagnosis method according to claim 1, further comprising training the abnormality detection model, wherein the training comprises:
- obtaining parameter data related to the motor bearings from a training data set;
- preprocessing the parameter data to generate the preprocessed parameter data;
- performing a feature extraction processing on the preprocessed parameter data to obtain one or more features; and
- training the abnormality detection model by taking at least one of the one or more features as an input to the abnormality detection model and taking data corresponding to the health condition of the motor bearings as an output of the abnormality detection model.

3. The health diagnosis method according to claim 1, wherein the rotor rotation data includes speed information of rotation and angular position information of rotation of the rotor.

4. The health diagnosis method according to claim 3, wherein the rotor rotation data is obtained by a resolver.

5. The health diagnosis method according to claim 4, wherein the current sensor is arranged to be electrically coupled to a stator in the motor, and the resolver is installed on a motor shaft of the motor.

6. The health diagnosis method according to claim 3, wherein the preprocessing the parameter data comprises performing a band-pass filtering processing on the parameter data.

7. The health diagnosis method according to claim 3, wherein the feature extraction processing comprises extracting at least one of the following features based on the preprocessed parameter data: kurtosis, skewness, root mean square, peak-to-peak value, variance, impulse factor and power spectral density.

8. The health diagnosis method according to claim 3, wherein the diagnosing the health condition of the motor bearings based on the output of the abnormality detection model comprises:
- comparing an output value of the abnormality detection model with a threshold;
- diagnosing the health condition of the motor bearings as healthy if the output value is less than or equal to the threshold; or
- diagnosing the health condition of the motor bearings as unhealthy if the output value is greater than the threshold;
- wherein the output value of the abnormality detection model is an abnormality probability value of the motor bearings.

9. The health diagnosis method according to claim 1, wherein the rotor rotation data is obtained by a resolver.

10. The health diagnosis method according to claim 9, wherein the current sensor is arranged to be electrically coupled to a stator in the motor, and the resolver is installed on a motor shaft of the motor.

11. The health diagnosis method according to claim 1, wherein the preprocessing the parameter data comprises performing a band-pass filtering processing on the parameter data.

12. The health diagnosis method according to claim 1, wherein the feature extraction processing comprises extracting at least one of the following features based on the preprocessed parameter data: kurtosis, skewness, root mean square, peak-to-peak value, variance, impulse factor and power spectral density.

13. The health diagnosis method according to claim 1, wherein the diagnosing the health condition of the motor bearings based on the output of the abnormality detection model comprises:
- comparing an output value of the abnormality detection model with a threshold;
- diagnosing the health condition of the motor bearings as healthy if the output value is less than or equal to the threshold; or
- diagnosing the health condition of the motor bearings as unhealthy if the output value is greater than the threshold;

wherein the output value of the abnormality detection model is an abnormality probability value of the motor bearings.

14. A computer-readable storage medium comprising instructions that are executed by a computer to realize the health diagnosis method according to claim 1.

15. The health diagnosis method according to claim 1, wherein the parameter data further includes current data associated with the motor of the electric vehicle.

16. The health diagnosis method according to claim 15, wherein the current data is obtained by a current sensor and the rotor rotation data is obtained by a resolver.

17. A health diagnosis system for motor bearings of an electric vehicle, the health diagnosis system comprising a memory and a processor coupled to the memory;

wherein the processor is configured to perform the following steps:

receiving parameter data related to the motor bearings collected by sensors;

preprocessing the parameter data to generate preprocessed parameter data;

performing a feature extraction processing on the preprocessed parameter data to obtain one or more features; and inputting the one or more obtained features into an abnormality detection model, and diagnosing a health condition of the motor bearings based on an output of the abnormality detection model, wherein the parameter data includes rotor rotation data associated with a rotor of a motor of the electric vehicle.

18. The health diagnosis system according to claim 17, wherein the parameter data further includes current data associated with the motor of the electric vehicle.

19. The health diagnosis system according to claim 18, wherein the current data is obtained by a current sensor and the rotor rotation data is obtained by a resolver.

20. The health diagnosis system according to claim 19, wherein the current sensor is arranged to be electrically coupled to a stator in the motor, and the resolver is installed on a motor shaft of the motor.

* * * * *